United States Patent [19]

Dahl

[11] 3,953,400

[45] Apr. 27, 1976

[54] POLYKETONES AND METHODS THEREFOR

[75] Inventor: Klaus J. Dahl, Palo Alto, Calif.

[73] Assignee: Raychem Corporation, Menlo Park, Calif.

[22] Filed: Mar. 15, 1974

[21] Appl. No.: 451,521

Related U.S. Application Data

[63] Continuation-in-part of Ser. No. 218,465, Jan. 17, 1972, abandoned, which is a continuation-in-part of Ser. No. 115,824, Feb. 16, 1971, abandoned.

[52] U.S. Cl. .............................. 260/47 R; 260/50
[51] Int. Cl.² ................. C08G 65/38; C08G 65/40
[58] Field of Search ........................... 260/47 R, 50

[56] References Cited
UNITED STATES PATENTS 3,441,538    4/1969    Marks .............................. 260/49

FOREIGN PATENTS OR APPLICATIONS 1,016,245    1/1966    United Kingdom
1,086,021    10/1967   United Kingdom
1,109,842    4/1968    United Kingdom Primary Examiner—Lester L. Lee
Attorney, Agent, or Firm—Lyon & Lyon

[57] ABSTRACT

Described herein are melt-processable, solvent resistant polymers comprised of repeating units of formula

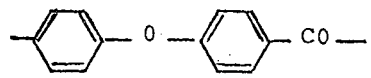

having a tensile elongation to break of at least about 50% at room temperature and mean inherent viscosity within the range from about 0.8 to about 1.65. The polymers, which are suitable for high temperature resistant wire insulation, are prepared, e.g., by the hydrogen fluoride-boron trifluoride catalyzed polymerization of a p-phenoxybenzoyl moiety-containing monomer (e.g., p-phenoxybenzoyl halide, p-phenoxybenzoic acid, or $C_1$-$C_3$ alkyl p-phenoxybenzoates) in the presence of a capping agent whose reactivity to acetylation is greater than about 150 relative to benzene reactivity of 1. Wet workup and spray drying techniques are described, the latter preferably including dilution of hydrogen fluoride with liquid $SO_2$, either before or after polymerization.

27 Claims, No Drawings

POLYKETONES AND METHODS THEREFOR

CROSS REFERENCE TO RELATED APPLICATIONS

This is a continuation-in-part of my copending application Ser. No. 218,465, filed Jan. 17, 1972, now abandoned which is a continuation-in-part of Ser. No. 115,824, filed Feb. 16, 1971, now abandoned, and is related to my concurrently filed applications entitled Polyketones and Methods Therefor, and Spray Drying Process, U.S. Pat. No. 3,751,398, the disclosures, all of which are expressly incorporated herein by reference.

FIELD OF THE INVENTION

This invention relates to polyketone polymers and more particularly, to melt processable polyketone polymers.

BACKGROUND OF THE INVENTION

In the continuing search for polymers suitable for use at elevated temperatures, many different repeating structures involving diverse connecting linkages have been suggested, e.g., aromatic structures connected by linkages such as imides, ethers, sulfones, ketones, etc. Unfortunately, as potential performance at elevated temperature has been enhanced, amenability of the polymer candidates to classical molten techniques of polymer fabrication has declined. More often than not, the same decline in melt processability accompanies attempts to produce temperature resistant polymers of elongation of at least about 50%, a necessary property for many polymer applications, e.g., if the polymer-insulated wire is to be capable of being twisted about itself without cracking of the insulation.

Aromatic polyketones are known to enjoy good resistance to thermal degradation. Bonner, in U.S. Pat. No. 3,065,205, suggested the Friedel-Crafts catalyzed polymerization of certain reactants to yield polyketones, listing as typical Friedel-Crafts catalysts ferric chloride and boron trifluoride. The reactants proposed fall into two classes, the first consisting of aryl ethers and polynuclear aromatic compounds, a member of which is heated with a member of a second class consisting of aliphatic and aromatic diacyl chlorides. The basic reactions taught by this patent, then, can be summarized as follows:

n(HR—O—RH) + n(Cl-A-Cl) → nHCl + H(R-O-R-A)$_n$Cl and n(HBH) + n(Cl-A-Cl) → nHCl + Cl(A-B)$_n$H where HBH is a polynuclear aromatic hydrocarbon such as naphthalene, HR-O-RH is an ether such as diphenyl ether, and Cl-A-Cl is a diacyl chloride such as terephthaloyl chloride or phosgene. When phosgene and diphenyl ether are reacted, the resulting polymer will contain the repeating unit

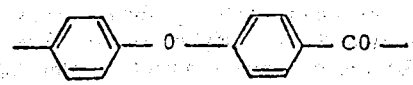

An entirely different approach is taken by Farnham and Johnson in British Patent No. 1,078,234 (corresponding to U.S. application 295,519, filed July 16, 1963). Here, polyarylene polyethers are produced by reaction of an alkali metal double salt of a dihydric phenol with a dihalo benzenoid compound. The dihydric phenol may contain a keto group — thus, 4,4'-dihydroxy benzophenone is claimed to give rise to a polyketone (See claim 15 of the British patent).

The same repeating unit is disclosed in British Patent No. 971,227 to arise from the reaction of diphenyl ether with phosgene, from the polycondensation of diphenyl ether-4-carbonyl chloride, and from the reaction of diphenyl ether with diphenyl ether-4,4'-dicarbonyl chloride.

A number of patents dealing with improved methods of making polyketones have since issued. Thus, for example, processes disclosed in U.S. Pat. Nos. 3,441,538 and 3,442,857 derive advantage by resort to hydrogen fluoride-enhanced boron trifluoride catalysis, a system earlier recognized in Boron Fluoride and its Compounds as Catalysts, etc., Topchiev et al, Pergamon Press (1959), p. 122; J. Org. Chem. 26 2401 (1961); and I&E Chem. 43, 746 (1951). A further patent dealing with an improved process is British Patent No. 1,086,021. The foregoing are incorporated herein by reference to illuminate the background of this invention.

Example 10 of British Patent No. 971,227 describes a manufacturing process for the polymer of repeating unit

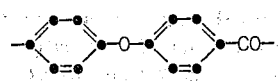

The product showed no signs of flowing up to 350°C and apparently required spinning from solution for fiber formation. The product is also variously described in Example 1 of U.S. Pat. No. 3,441,538 as yielding polymer of low elongation and tough, opaque brown films, while in British Pat. No. 1,153,527 this polymer is characterized as highly crystalline and intractable from the standpoint of conventional melt fabrication.

From the foregoing it will appear that while this polymer of a basically simple repeating unit possesses characteristics which render it a feasible candidate for high temperature application, its intractability in heretofore realized embodiments has rendered it illsuited to conventional melt processing. Thus, a need has existed for melt processable polyketones comprised of the repeating unit

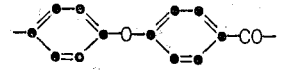

Moreover, a need has existed for such polymers endowed with resistance to solvent attack.

BRIEF SUMMARY OF THE INVENTION

According to this invention, there is provided a melt processable polymer having repeating units of formula

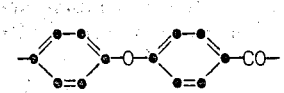

having a mean inherent viscosity within the range of from about 0.8 to about 1.65 and elongation of at least about 50%. The polymer is made in an environment essentially uncontaminated by transition metals, e.g., Fe, Cr, Co, Ni, so as to minimize cross-linking and in the presence of an aromatic capping agent whose rate of acetylation relative to benzene is greater than about 150. Preferably the polymerization is boron trifluoride catalyzed. In a preferred embodiment, the resistance of the polymer to solvent attack is enhanced by extracting therefrom essentially all polymer chains of inherent viscosity less than about 0.6.

The novel processes of the invention provide polymers, which are also novel, having good high temperature properties and which are at the same time readily melt processable so as to yield an extrudable product useful for wire and cable insulation. Additionally, the polymers of the invention can be fabricated by conventional injection-molding techniques.

Since the basic reaction conditions for making polyketone-type polymers have been described at length in the above patents, emphasis is laid in the following description of the preferred embodiments upon those novel features from which the many advantages of the invention derive.

To obtain melt processable polymer of elongation greater than about 50%, it has now been found that mean inherent viscosity must be controlled to within the range from about 0.8 to about 1.65. Below about 0.8 precipitous falloff of percent elongation can be occasioned by process variation, while polymer of mean inherent viscosity greater than about 1.65 has a melt viscosity so high as to yield, at best, rough extrudate rather than the smooth, coherent coat necessary for wire insulation. Preferably, mean inherent viscosity is maintained within the range from about 1.2 to about 1.6, most preferably about 1.4. In extruding polymer of inherent viscosity greater than about 1.5 onto small gauge wire at running speed of 300–400 fpm, melt fracture has on occasion been experienced. Polymer of greater viscosity, of course, can be extruded onto large gauge wire and in the form of rods for chowdering or fiber drawing operations.

Inherent viscosity, and therefore melt processability, is controlled by the judicious employment of selected aromatic capping agents. The capping agent terminates polymerization through Friedel-Crafts catalyzed acylation reaction with the active polymer chain. For example, boron trifluoride catalysis of the polymerization of monomers yielding poly(benzophenone ether) proceeds through formation of a highly reactive carboxonium ion-containing intermediates, such as, in the case of acyl fluoride monomer, a tetrafluoborate, e.g.,

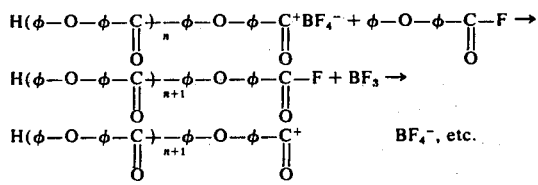

The chain is terminated by capping agent and boron trifluoride subsequently removed, for example, thus:

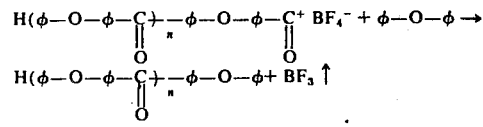

From the foregoing, it will be apparent that the capping agent should enjoy reactivity toward acylation of the same order of magnitude as that of the monomer and it has been found that for effective molecular weight control in the molecular weight range which provides melt processable polymer the capping agent should enjoy reactivity to acetylation (relative to benzene reactivity equal to 1) greater than about 150. For example, the literature [Cf. Kimoto, J.Pharm.Soc. Japan 75, 727 (1955) and Brown et al, J.Am.Chem.Soc. 81, 5929 (1959] yields the following values for relative rate of acetylation in the system $CH_3COCL/AlCl_3$:

TABLE I

| AGENT | RELATIVE RATE OF ACETYLATION |
|---|---|
| Benzene | 1.00 |
| Biphenyl | 205 |
| 4-acetyldephenyl ether | 448 |
| Diphenyl ether | 11,600 |
| 4-methyldiphenyl ether | 81,000 |

The aromatic capping agent employed is preferably non-aliphatic and most preferably non-ring-substituted, as by nitro, methyl, aryloxy methoxy, methoxy carbonyl or acetyl where high temperature polymer performance is desired. In such case, it will readily be appreciated that agents subject to oxidative or thermal degradation are to be avoided as giving rise to discolored polymer, etc. Most generally, any condensed polynuclear aromatic system or aryl- or aryl-substituted benzene of sufficient reactivity to acylation and soluble in the reaction medium can be employed, i.e., biphenyl, diphenylether, and phenoxybenzophenone, 4,4'- diphenoxybenzophenone.

Within the range of inherent viscosity required for melt processability, log (inherent viscosity) appears to be linearly related to log (mole percent capping agent). Thus, for example, the following relationship has obtained in the polymerization of p-phenoxybenzoyl chloride in the system

TABLE II

| CAPPING AGENT | MOLE % AGENT | MEAN INHERENT VISCOSITY OF PRODUCT |
|---|---|---|
| Biphenyl | 0.25 | 2.25 |
| | 0.35 | 1.80 |
| | 0.50 | 1.40 |
| | 0.75 | 1.05 |
| | 1.00 | 0.87 |
| Diphenyl ether | 0.36 | 2.34 |
| | 0.77 | 1.12 |
| | 1.14 | 1.04 |
| | 2.01 | 0.56 |
| | 4.01 | 0.30 |

The reaction conditions were as follows:

Monomer concentration 1 mole/liter. The reaction was run at 0°C with 5 psi $BF_3$ for 6 hours followed by 20°C with 5 psi $BF_3$ for 15 hours. Where a diacyl fluoride monomer is employed (e.g., diphenyl ether (4,4'-dicarbonyl fluoride) with diphenyl ether) the reactive intermediates before and during polymerization can be characterized as, e.g.,:

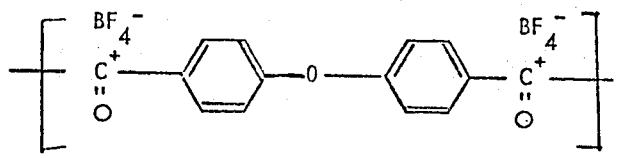

and

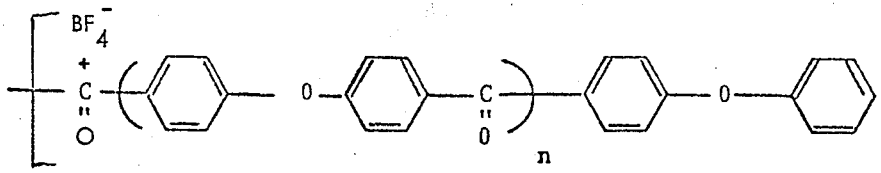

In this case, then, the ultimate polymer will be doubly capped, bearing a capping agent or residue thereof at either end. In the given example, of course, it is the excess of the diphenyl ether which serves as capping agent although a separate and distinct agent such as biphenyl might be employed as well or in lieu thereof.

In a practical sense, then, the capped polymers of the invention can be represented as follows:

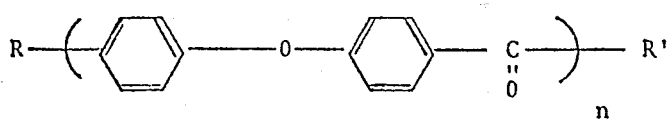

where R' is the capping agent and R is hydrogen. When the polymer is made from a diacid fluoride monomer and suitable aromatic hydrocarbon such as diphenyl ether, the capped polymers of the invention can be represented as follows:

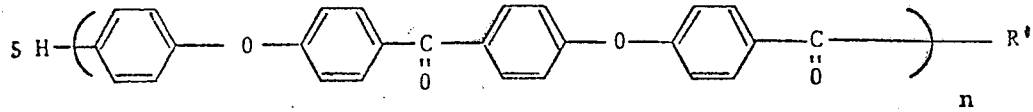

where R' is the capping reagent.

If the diacid fluoride monomer is used in a molar excess over the aromatic hydrocarbon, the capped polymers of the invention can be represented as follows:

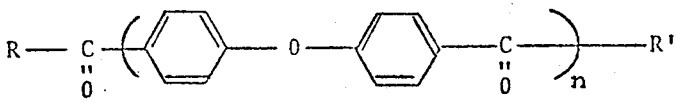

where R and R' are independently selected. It will be understood, of course, that R and R' can be independently selected, i.e., mixtures of capping agents can be employed.

It has also been found that, if polymer within the requisite range of mean inherent viscosity and yet having tensile elongation to break of at least about 50% at 25°C when elongated at a rate of 200 percent per minute (hereinafter referred to as elongation) is to be obtained, polymerization must be conducted in such fashion as to prevent polymer contamination by transition metals, e.g., Fe, Cr, Co, Ni, etc., since these are believed to give rise to premature crosslinking and in any case provide polymer within the requisite range in inherent viscosity but of very low elongation. For example, Example 1 of U.S. Pat. No. 3,441,538 polymerizes p-phenoxybenzoyl chloride in the system HF/BF₃, using a stainless steel reaction vessel. Films of inherent viscosity of 1.18 are reportedly obtained, the polymer exhibiting elongation of no more than 7.2 percent and hence being quite unsuited to wire insulation application.

Accordingly, reaction should proceed in an environment essentially uncontaminated by transition metals, as in plastic (e.g., polytetrafluoroethylene (PTFE), polyethylene, polychlorotrifluoroethylene (PCTFE) plastic-coated, aluminum or other such vessels. Most preferably, the environs of polymerization are entirely non-metallic.

From the mechanism stated above and from the repeating unit

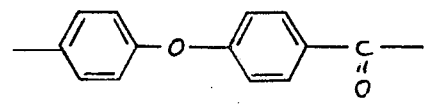

itself, it will be apparent that various monomers and monomer combinations can be employed, e.g. phenoxybenzoyl fluoride alone, diphenyl ether (4,4'-dicarbonyl fluoride) with an excess of diphenyl ether, etc. p-Phenoxybenzoyl fluoride is the preferred monomer, and is most generally obtained by reacting a corresponding non-fluorine halide (preferably p-phenoxybenzoyl chloride) with hydrogen fluoride. This can be immediately followed by introduction of boron trifluoride and commencement of polymerization. Alternatively, the formed acyl fluoride can be recovered from hydrogen fluoride by distillation or the like for subsequent polymerization. In the latter case, color bodies formed by HF reaction with impurities commonly present in the commercial grade acyl chloride are left behind.

p-Phenoxybenzoic acid or the corresponding $C_1$-$C_3$ alkyl benzoates may be employed as monomers in lieu of the acyl halides. The acid itself may be obtained by Ullmann condensation of phenol and p-chlorotoluene, followed by cobalt acetate-catalyzed oxidation to the acid. The ester monomers are secured by alcoholysis of the acid chloride or by esterification of the acid.

Hydrogen fluoride is employed in every case as solvent for the formed polymer and can participate in the polymerization reaction as well. Thus, for example, the mechanism by which the acid chloride is polymerized appears to include conversion of the monomer to an acid fluoride intermediate. Polymerization may be had by admitting BF₃ to a hydrogen fluoride solution containing from about 3 to 30% by weight, preferably from about 15 to 25% by weight monomer. As an alternative to the use of HF alone, $BF_3$ may be admitted to a solution of monomer in HF and liquid sulfur dioxide, as is discussed hereinafter.

Where polymerization is conducted in HF alone, the temperature of polymerization is preferably between about 0°C and 50°C, most preferably between about 0°C and room temperature. Polymerization temperatures equal to or greater than about 100°C should be avoided, while temperatures less than 0°C, will, of course, decrease polymerization rate. The preferred course, however, is to conduct polymerization in the presence of, e.g., 50% by volume liquid $SO_2$, in which event temperature is maintained at about 0°C to maintain the $SO_2$ in the liquid state at the pressure prevailing in the reaction vessel. $SO_2$ appears to deprotonate ketone moieties of the polymer, so that $BF_3$ is held not in ionic association therewith, but more loosely in a donor-acceptor complex. $SO_2$ is similarly believed to influence the extent to which water and alcohol by-products of, respectively, acid and ester polymerization bind $BF_3$. In any case, heating during the preferred spray drying workup also acts to free bound $BF_3$, so that presently the beneficial effect of $SO_2$ in this regard has not been quantitatively established. However, the use of $SO_2$ has been found advantageous in numerous other regards. Where polymer is recovered by precipitation in a relative non-solvent, e.g., acetone, methylethylketone, dimethyl formamide, dimethyl acetamide, N-methylpyrrolidone, acetic acid or chlorinated acetic acid, the liquid $SO_2$ minimizes undue temperature rise associated with heat of dilution of the hydrogen fluoride in the solvent. Unfortunately, wet workup exposes polymer to nucleophilic solvents capable of interacting with the polymer to introduce thermal instability.

It has been found that resistance of the polymer to attack by ketonic solvents and the like is greatly enhanced if the polymer produced as hereinabove described is subjected to extraction with a solvent therefor, preferably with an aliphatic ketone such as acetone or with a chlorinated aliphatic hydrocarbon such as trichloroethylene. Extraction preferably is undertaken at temperature within the range from about 30° to about 50°C, and is continued for a period of time sufficient to extract from about 4 to 10% by weight of the polymer. The resulting polymer, while yet within the range of mean inherent viscosity requisite for melt processability, is essentially free of chains of inherent viscosity less than about 0.6. and is solvent resistant under stress when employed to insulate electrical conductors. Extraction where desired should be made before the polymer has been brought to a temperature above its glass transition temperature (about 160°C for poly (benzophenone ether) homopolymer) since the onset of crystallization reduces extractability of the lower molecular weight moieties which give rise to solvent stress crazing.

Parenthetically, it should be noted that acetone can be characterized as a "non-solvent" when considering the relatively benign exposure attending the precipitative workup, and can yet be employed to leach out lower molecular weight moieties during the longer periods associated with extraction. Indeed, even when employed as a "non-solvent" in precipitating raw polymer, acetone can influence mean inherent viscosity to a measurable extent. For example, addition of a 20% by weight solution of poly (benzophenone ether) in HF diluted to 5% solids content with $SO_2$ to a stirred mixture of $SO_2$ - acetone leads to precipitation of polymer whose mean inherent viscosity depends on the acetone concentration as shown below:

TABLE III

| Percent Acetone in Sulfur Dioxide | Inherent Viscosity of Polymer Precipitate |
|---|---|
| 15 | 1.57 |
| 17.5 | 1.56 |
| 20 | 1.55 |
| 25 | 1.51 |
| 100 | 1.50 |

The extracted polymer displays under solvent stress crazing conditions markedly superior break strength and elongation.

While leaching polymer resulting from wet workup provides satisfactory product, it would be advantageous to forego that step, for which reason I presently prefer to spray dry the product of polymerization rather than subject the same to wet workup by non-solvent precipitation. The polymer may be spray dried in HF alone, employing vessels whose walls are appropriately lined against corrosion. However, I have found that liquid $SO_2$ affords polymer lighter in color than arises from spray drying from HF alone. Used in lieu of HF for dilution to solids contents best suited to spray dying, $SO_2$ reduces corrosion of spray dryer walls and achieves substantial economies by reason of its relatively lower cost. While a detailed description of $SO_2$ spray drying appears in my aforesaid U.S. Pat. No. 3,751,398, the presently preferred process may be briefly described as entailing dilution of the polymer solution to about 1-2% solids, providing a solution containing a major proportion, preferably 90–99% by volume $SO_2$. The dilute solution is conveyed under pressure of, e.g. 20 psig at -6C to a two fluid nozzle, from which it is sprayed and contacted with hot air or gaseous $SO_2$. Inlet gas temperatures on the order of 190°–220°C afford particulate polymer having but about 2–5% by weight fluorine volatiles. Preferably, fluorine content of the spray dried product is thereafter reduced to less than 100 ppm in a vacuum oven operating at, e.g., 140°C.

The melt processable polymer of the invention can be readily extruded onto electrical conductors, most commonly in the case of wires in coats of from about 5 to 12 mils in thickness. The coated wire is preferably annealed, as by exposure to about 220°C for about 2 minutes, to produce a generally abrasion resistant, stronger and dimensionally stable insulative coating. Following annealing the preferred polymer has elongation on the order of about 125%.

It has also been discovered that, following fabrication, the polymer can be thermally crosslinked to enhance solvent resistance and dimensional stability above the melting point. For example, when poly(benzophenone ether) coated wire is exposed in an inert atmosphere at about 1200°C for from about 1/4 to about 2 seconds, the resulting product is at least surface crosslinked and displays good resistance to solvent crazing even where acetone or other extraction has not previously been had. In general, crosslinking can be had at polymer temperatures within the range from about 300°C to about 600°C. It will be appreciated, of course, that both annealing and thermal crosslinking are inversely time and temperature dependent, and suitable times and temperatures for each will readily occur to the art-skilled from the foregoing, all depending upon contemplated service conditions and like considerations.

The invention is further illustrated by the following examples, in which all parts and percentages are by weight and temperatures in °C unless otherwise indicated. Throughout, mean inherent viscosity is determined according to the method of Sorenson et al, Preparative Methods of Polymer Chemistry Interscience (1968), p. 44 [0.1 g polymer in 100 ml. soln. of conc. $H_2SO_4$ at 25°C].

EXAMPLE 1

Into a six-liter PTFE bottle, equipped with a PTFE gas inlet, magnetic stirrer, and PTFE coil condenser cooled with a dry ice-acetone bath was placed 1182 g (5.096 moles) of p-phenoxybenzoyl chloride and 4.132 g (0.027 moles; 0.525 mole percent) of biphenyl. Four liters of anhydrous hydrogen fluoride was condensed into the reactor at −78°. The reaction mixture was gently warmed to room temperature to expel hydrogen chloride, then cooled to −78°, and 532 g (7.85 moles) of boron trifluoride was slowly added under slight pressure. After addition was complete, the reaction was allowed to come to room temperature and remain for 20 hours under a positive pressure of boron trifluoride.

The polymer solution was diluted with anhydrous hydrogen fluoride and poured into rapidly stirred acetone, which precipitated the polymer. The polymer was washed with acetone and water, followed by vacuum drying at 150° to 160°, to give 900 g (90%) of colorless polymer of inherent viscosity 1.45 (0.1 g/100 ml conc. $H_2SO_4$, 25°). The polymer exhibited elongation greater than about 125%. The crystalline melting point (differential scanning colorimeter) was about 365°C.

EXAMPLE 2 a. Preparation of p-phenoxybenzoyl fluoride

A 50 ml PCTFE reactor tube was charged with 23.25 g (0.10 moles) of p-phenoxybenzoyl chloride and a magnetic stir bar. The tube was then connected to a PCTFE vacuum line (Toho Kasei Co., Ltd. Osaka, Japan) and 10 ml of anhydrous hydrogen fluoride was condensed into the reactor tube at −196°. The tube was warmed to 0°, and held at this temperature for two hours. Excess hydrogen fluoride, together with hydrogen chloride, is then removed by distillation. The resulting distillation residue was dissolved in 20 ml methylene chloride to which was added 1 g of sodium fluoride, the latter as a scavenger for residual HF. The solution was stirred overnight, then filtered, and taken to dryness to give a slightly yellow crystalline mass. Distillation at 100° to 110° (bath)/0.1 mm Hg gave 20.00 g (0.0926 moles, 93%) of colorless liquid which solidified at room temperature; mp 39°–40°. Gas chromatographic analysis indicated one component. Methanolysis gave the same methyl ester as obtained from p-phenoxybenzoyl chloride. The infrared spectrum (KBr) showed a strong band at 1803 $cm^{-1}$, indicative of acyl fluorides.

b. Polymerization of p-phenoxybenzoyl fluoride

A 50 ml PCTFE tube was charged with 5.50 g (25.55 mmoles) of p-phenoxybenzoyl fluoride, 0.0118 g (0.0694 mmoles, 0.271 mole percent) of diphenyl ether and a stir bar. The tube was connected to the PCTFE vacuum line and purged with nitrogen. Into the reaction tube was then condensed at −196° 20 ml of anhydrous hydrogen fluoride, followed by 2.60 g (38.29 mmoles) of boron trifluoride. After warming to room temperature, the reaction mixture was stirred for one hour. Then, excess boron trifluoride was purged from the reactor system with nitrogen. The orange-yellow, viscous polymer solution was diluted with anhydrous hydrogen fluoride and poured into rapidly stirred acetone which caused precipitation of the polymer. The polymer was washed with acetone and water, followed by vacuum drying at 200°, to give 4.80 g (95%) of colorless granular powder of inherent viscosity 1.56 (0.1 g/100 ml conc. $H_2SO_4$, 25°), elongation greater than about 125%.

EXAMPLE 3

The procedure of Example 2b was repeated using 0.204 mole percent of diphenyl ether to give a polymer of inherent viscosity 2.00. The polymer was compression molded at 420° to give a colorless, transparent, and flexible slab. This slab turned opaque on annealing at 225° for 5 minutes. The polymer exhibited elongation greater than 125%.

EXAMPLE 4

A one-kilogram sample of poly(benzophenone ether) of inherent viscosity 1.43 was extruded through a ¾-inch Brabender extruder at 410° to 420°. The resulting polymer ribbon was pelletized and fed into a Brabender extruder equipped with a standard wire coating die. Preheated 20 AWG nickelcoated copper wire was passed through the die and the polymer melt was drawn down onto the wire to give a tight and coherent wire insulation. This insulation shows an elongation of 125% and a tensile strength of 19,000 psi. The insulated wire was exposed to various elevated temperatures in air and the time duration which effected a decrease in elongation to 50% was determined. These data are shown below.

| Temperature °C | Time to 50% Elongation hrs. |
|---|---|
| 360 | 19 |
| 340 | 37 |
| 320 | 89 |
| 300 | 187 |
| 280 | 648 |

At 250°C the insulation exhibits a tensile strength of 8500 psi and an elongation of 150%. The example demonstrates the conjoint attainment of advantageous melt processability, high elongation and good high temperature proprties (i.e., excellent oxidative stability) which lies at the heart of the invention.

EXAMPLE 5

A sample of poly(benzophenone ether) prepared in a PTFE reactor (inherent viscosity 1.55) gave a colorless slab on compression molding and showed no metal contamination by X-ray fluorescence spectroscopy. This material developed cracks when exposed to acetone under stress. Extraction of this polymer in a Soxhlet extractor with acetone for 15 hours gave a fluffy white extract (4%) of inherent viscosity 0.69, while the extracted polymer now showed an inherent viscosity of 1.62. A slab molded from the extracted polymer did not stress-crack in acetone. Tensile bars were pulled in the Instron apparatus and acetone was sprayed against the bars when the yield point was reached; the effect of this treatment on tensile strength and elongation is shown below:

| Property | Polymer, Not Extracted | Polymer Extracted |
|---|---|---|
| Yield Strength, psi | 12,600 | 12,300 |
| Break Strength, psi | 9,600 | 12,400 |
| % Elongation | 20 | 85 |

EXAMPLE 6

This example demonstrates the preferred spray drying workup. A hydrogen fluoride solution of 25 weight % of poly(benzophenone ether) was diluted with liquid sulfur dioxide to a solids content of 1.3%. This brought about a decrease in solution viscosity from 1900 cp to 2 cp. The solution, contained in a poly(chlorotrifluoroethylene) coated vessel was then fed to a laboratory spray dryer (Koch Model 10D, 1 meter diameter). An air pressure of 5–15 psig in the feed vessel provided the driving force to overcome frictional losses in lines and valves. All materials of construction were chosen for maximum corrosion resistance and included fluoroplastics, Hastelloy C, and 304 stainless steel.

The spray dryer consists of a hot gas plenum with a perforated plate through which the hot gases (air in the present case) pass prior to contact with the liquid spay, an insulated cylindrical drying chamber with a conical bottom and a cyclone separator to separate the solid polymer powder from the hot gases. The HF/SO$_2$/-polymer solution is atomized in a Lurgi two-fluid nozzle with air at a flow rate of approximately 11 SCFM and 20–40 psig being supplied to the nozzle at ambient temperature. The nozzle is located below the perforated plate in the cylindrical chamber on the cener line of the cylinder.

The spray dryer, cyclone separator, and associated ducting are constructed of 304 stainless steel with all flanged joints sealed with silicone rubber adhesive sealant. Braided poly(tetrafluoroethylene) protection gaskets are located between the inside surface of the dryer and the sealant. The exhaust gases are cooled in a 304 stainless steel after cooling tower by passing them through several cold water sprays. The gases are then scrubbed in a polypropylene lined caustic scrubbing tower. The nozzle and the supporting lance are constructed of Hastelloy C.

The polymer solution is fed to the two-fluid nozzle at a rate of 17 gal/hr and at a temperature of −6° to ensure that no vaporization of the solvents occurs prior to the discharge end of the nozzle. The hot air, used as the drying mdium, cnters the dryer at 220° at a rate of 446 SCFM and exits at 160°. Heat losses due to mixing of hot and cold air streams and heat transfer through the insulation account for 20°–30° of the noted temperature drop. The remainder of the thermal energy is used to vaporize the solvent. The hot air enters the spray dryer at a pressure of 30 inches of water and enters the cyclone separator at a pressure of 20 inches of water.

The polymer is collected at the bottom of the cyclone separator in the form of a powder. The powder is heated at 150° under vacuum overnight in an oven to remove the final traces of volatile components prior to extrusion. From a sample taken of the dried material, the elongation is found to be greater than 100%.

The level of fluorine is determined on the spray dried polymer by first carrying out a fusion of the polymer with sodium peroxide at elevated temperaure in a sealed nickel bomb ("Chemistry of Organic Fluorine Compounds" by Milos Hudlicky, The MacMillan Co., New York, 1962, p 322), followed by a spectrophotometric determination of fluorine with a zirconium Eriochrome Cyanine R lake [Stephen Megregian, Anal. Chem., 26, 1161 (1954)]. Polymer so dried is found to contain not more than about 50–100 ppm fluorine.

The polymers of the invention may, of course, incorporate comonomers calculated to contribute properties of advantage, e.g., greater strength and crystallinity, higher melting point, etc. Thus, for example, from about 5 to 50% by weight of comonomers such as p-(phenylthio)benzoyl chloride, m-phenoxybenzoyl chloride, alpha-naphthoyl fluoride, betanaphthoyl fluoride, 5-(alpha-naphthoxy)-alpha-naphthoyl chloride, 5-(alpha-naphthylthio)-alpha-naphthoyl chloride, 5-(alpha-naphthyl)-alpha-naphthoyl chloride, 6-(beta-naphthoxy)-beta-naphthoyl chloride, 2-dibenzofuran carbonyl chloride, 2-thianthrene carbonyl chloride, 2-phenoxathiin carbonyl chloride, 2-phenodioxin carbonyl chloride, 2-dibenzothiophene carbonyl chloride, 3(4'-biphenyloxy) benzoyl fluoride, 4(4'-biphenyloxy) benzoyl fluoride, 3(2'-biphenyloxy) benzoyl fluoride, 4(2'-biphenyloxy) benzoyl fluoride, 3-(1'naphthoxy) benzoyl fluoride, 4-(1' naphthoxy) benzoyl fluoride, 3-(2' naphthoxy) benzoyl fluoride, 4-(2' naphthoxy) benzoyl fluoride can be employed in the polymerization. Monomers suitable for copolymerization with phenoxybenzoyl fluoride can generally be formed by the reaction of nucleophilic materials such as diphenyl sulfide 4,4'-diphenoxybiphenyl, p-phenoxyphenol, 2,2'-diphenoxybiphenyl, p-phenylphenol 1,4 -diphenoxybenzene, dibenzofuran 1,3-diphenoxybenzene, -thianthrene 1-phenoxynaphthalene, phenoxathiin, 1,2-diphenoxynaphthalene, phenodioxin, diphenyl ether, diphenylene, 1,5-diphenoxynaphthalene with electrophilic materials such as phosgene, carbonyl difluoride, isophthaloyl chloride, benzene-1, 4-di(sulfonyl chloride), benzene-1,3-di(sulfonyl chloride), 2-chlorobenzene-1,4-disulfonyl chloride, thio-bis (4,4'-benzoyl chloride), oxy-bis (4,4'-benzene sulfonyl chloride), benzophenone-4,4'-di(carbonyl chloride), oxy-bis (3,3'-benzoyl chloride), thio-bis (3,3'-benzene sulfonyl chloride), oxy-bis (3,3'-benzene sulfonyl chloride), diphenyl-3,3'-di(carbonyl chloride), carbonyl-bis(3,3'-benzoyl chloride), sulfonyl-bis(4,4'-benzoyl chloride) sulfonyl-bis(3,3'-benzoyl chloride), sulfonyl-bis (3,4'-benzoyl chloride), thio-bis(3,4'-benzoyl chloride), diphenyl-3,4'-di(carbonyl chloride), oxy-bis(4,4'-(2-chlorobenzoyl chloride)), naphthalene-1,6-di(carbonyl chloride), naphthalene-1,5-di (carbonyl chloride), naphthalene-2,6-di(carbonyl chloride), naphthalene-1,5-di(sulfonyl chloride), oxy-bis(7,7'-naphthalene-2,2'-di(carbonyl chloride)), thio-bis (8,8'-naphthalene-1,1'-di(carbonyl chloride)), 7,7'-binaphthyl-2,2'-di(carbonyl chloride), diphenyl-4,4'-di(carbonyl chloride). Again, for example, m-phenoxybenzoyl fluoride can be copolymerized with the para isomer where high melting point and solvent resistance are not especially critical.

Of course, Friedel-Crafts catalysts other than BF$_3$ could be employed, e.g., AsF$_5$, PF$_5$, etc., but boron trifluoride is preferred from the standpoint of ease of removal, relative non-toxicity and like considerations.

These and other variations on the preferred embodiments disclosed above will clearly appear to the art-skilled from the preceding detailed discussion. In any case, it will be recognized that for the first time there are provided by this invention polyketone polymers which are at one and the same time high temperature resistant, melt processable, and of elongation sufficient for employment in wire and cable insulation.

I claim:

1. A crystalline melt-processable polymer consisting essentially of repeating units of formula

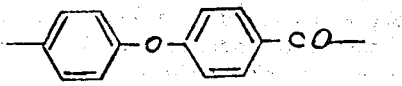

having a mean inherent viscosity within the range from about 0.8 to about 1.65 and elongation of at least about 50%.

2. A melt-processable polymer according to claim 1 exhibiting a mean inherent viscosity within the range from about 1.2 to about 1.4.

3. A solvent resistant polymer according to claim 1 whose polymeric chains consist essentially of chains of inherent viscosity greater than about 0.6.

4. A solvent resistant thermally crosslinked polymer according to claim 1.

5. A melt-processable polymer of formula

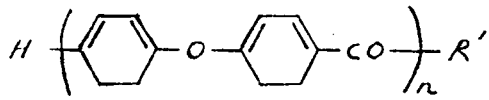

having elongation of at least about 50%, n being such as to provide mean inherent viscosity within the range from about 0.8 to about 1.65 R' being independently selected from the group of aromatic capping agents whose rate of acetylation relative to benzene is greater than about 150.

6. A solvent resistant polymer according to claim 5 whose polymeric chains consist essentially of chains of inherent viscosity greater than about 0.6.

7. The polymer of claim 5 wherein R' is selected from the group consisting of non-aliphatic aromatic hydrocarbons whose rate of acetylation relative to benzene is greater than about 150.

8. A high temperature resistant polymer according to claim 7 wherein R' is selected from the group consisting of biphenyl and diphenyl ether.

9. A melt processable polymer of formula

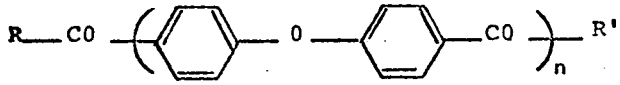

having elongation of at least about 50%, n being such as to provide mean inherent viscosity within the range from about 0.8 to about 1.65, R and R' being independently selected from the group of aromatic capping agents whose rate of acetylation relative to benzene is greater than about 150.

10. A solvent resistant polymer according to claim 9 whose polymeric chains consist essentially of chains of inherent viscosity greater than about 0.6.

11. The polymer of claim 9 where in R and R' are selected from the group consisting of non-aliphatic aromatic hydrocarbons whose rate of acetylation relative to benzene is greater than about 150.

12. A high temperature resistant polymer according to claim 11 wherein R and R' are selected from the groups consisting of biphenyl and diphenyl ether.

13. In the process of producing a polymer comprised of the repeating units

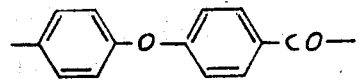

which comprises polymerizing monomers reactive under Friedel-Crafts acylating conditions in an environment essentially uncontaminated by transition metals to yield polymer containing said repeating units, the improvement whereby melt processable polymer of elongation of at least about 50% is obtained which comprises polymerizing said monomers in the presence of an aromatic capping agent whose rate of acetylation relative to benzene is greater than about 150 in an amount sufficient to yield polymer of mean inherent viscosity within the range from about 0.8 to about 1.65.

14. The method of claim 13 wherein said monomers comprise an aromatic acyl fluoride and wherein said polymerization is catalyzed by boron trifluoride.

15. The method of claim 14 wherein said capping agent is a non-aliphatic aromatic hydrocarbon whose rate of acetylation relative to benzene is greater than about 150.

16. The method of claim 15 wherein said capping agent is selected from the group consisting of biphenyl and diphenyl ether.

17. The method of claim 14 wherein said acyl fluoride arises from the reaction of hydrogen fluoride with the corresponding aromatic acyl chloride.

18. The method of claim 17 wherein said acyl fluoride is recovered from hydrogen fluoride solution by distillation for subsequent polymerization.

19. The method of claim 17 wherein polymer is recovered by spray drying from hydrogen fluoride solution.

20. The method of claim 14 wherein said polymer is extracted with a solvent therefor for a period of time sufficient to reduce the polymer in weight from about 4 to about 10%.

21. The method of claim 14 wherein said solvent is an aliphatic ketone and wherein essentially all polymer chains of inherent viscosity less than about 0.6 are extracted.

22. A method which comprises polymerizing p-phenoxybenzoyl fluoride in an environment essentially uncontaminated by transition metals and in the presence of an effective catalytic amount of boron trifluoride and a non-aliphatic aromatic capping agent in an amount sufficient to yield polymer of at least about 50% elongation and having mean inherent viscosity within the range from about 0.8 to about 1.65.

23. The method of claim 22 wherein said p-phenoxybenzoyl fluoride arises from reaction of hydrogen fluoride and the corresponding acyl chloride.

24. The method of claim 22 wherein said capping agent is selected from the group consisting of biphenyl and diphenyl ether.

25. A crystalline melt-processable copolymer having as its major repeating unit the formula

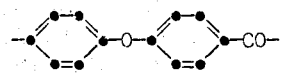

and said copolymer having a mean inherent viscosity within the range from about 0.8 to about 1.65 and elongation of at least about 50%.

26. The copolymer of claim 25 in which the minor repeating units are formed from monomers selected from the group consisting of p-(phenylthio)benzoyl chloride, m-phenoxybenzoyl chloride, alpha-naphthoyl fluoride, beta-naphthoyl fluoride, 5-(alpha-naphthoxy)-alpha-naphthoyl chloride, 5-(alpha-naphthyl-thio)-alpha-naphthoyl chloride, 5-(alpha-naphthyl)-alpha-naphthoyl chloride, 6-(beta-naphthoxy)-beta-naphthoyl chloride, 2-dibenzofuran carbonyl chloride, 2-thianthrene carbonyl chloride, 2-phenoxathiin carbonyl chloride, 2-phenodioxin carbonyl chloride, 2-dibenzothiophene carbonyl chloride, 3(4'-biphenylyloxy)benzoyl fluoride, 4(4'-biphenylyloxy)benzoyl fluoride, 3(2'-biphenylyloxy)benzoyl fluoride, 4(2'-biphenyloxy)benzoyl fluoride, 3(1'-naphthoxy)benzoyl fluoride, 4(1'-naphthoxy)benzoyl fluoride, 3(2'-naphthoxy)benzoyl fluoride, 4(2'-naphthoxy)benzoyl fluoride.

27. The copolymer of claim 25 in which the minor repeating units are formed from monomers resulting from the reaction of chemicals selected from the group consisting of diphenyl sulfide, 4,4'-diphenoxybiphenyl, p-phenoxyphenol, 2,2'-diphenoxybiphenyl, p-phenylphenol, 1,4-diphenoxybenzene, dibenzofuran, 1,2-diphoxybenzene, thianthrene, 1-phenoxynaphthalene, phenoxathiin, 1,2-diphenoxynaphthalene, diphenyl ether, diphenylene, 1,5-diphenoxynaphthalene, with chemicals selected from the group consisting of phosgene, carbonyl difluoride, isophthaloyl chloride, terephthaloyl chloride, benzene-1, 4-di(sulfonyl chloride), benzene-1, 3-di(sulfonyl chloride), 2-chlorobenzene-1, 4-disulfonyl chloride, thio-bis (4,4-benzoyl chloride), oxy-bis (4,4-benzene sulfonyl chloride), benzophenone-4,4'-di (carbonyl chloride), oxy-bis (3,3'-benzoyl chloride, thio-bis (3,3'-benzene sulfonyl chloride), oxy-bis (3,3'-benzene sulfonyl chloride), diphenyl-3,4'-di(carbonyl chloride), carbonyl-bis(3,3'-benzoyl chloride), sulfonyl-bis(4,4'-benzoyl chloride) sulfonyl-bis (3,3'-benzoyl chloride), sulfonyl-bis (3,4'-benzoyl chloride), thio-bis(3,4'-benzoyl chloride), diphenyl-3,4'-di(carbonyl chloride), oxy-bis(4,4'-(2-chlorobenzoyl chloride)), naphthalene-1,6-di(carbonyl chloride), naphthalene-1,5-di (carbonyl chloride), naphthalene-2,6-di(carbonyl chloride), naphthalene-1, 5-di(sulfonyl chloride), oxy-bis (7,7'-naphthalene-2,2'-di(carbonyl chloride)), thio-bis (8,8'-naphthalene-1,1'-di(carbonyl chloride)), 7,7'-binaphthyl-2,2'-di(carbonyl chloride), diphenyl-4,4'-di(carbonyl chloride).

* * * * *